June 18, 1929.  W. A. STARCK  1,717,896

AUTOMOBILE BUMPER

Filed Feb. 8, 1928

Inventor:
William A. Starck
By Edwin B. H. Tower Jr.
Atty.

Patented June 18, 1929.

1,717,896

UNITED STATES PATENT OFFICE.

WILLIAM A. STARCK, OF MILWAUKEE, WISCONSIN, ASSIGNOR TO BADGER MANUFACTURING CORPORATION, OF MILWAUKEE, WISCONSIN, A CORPORATION OF DELAWARE.

AUTOMOBILE BUMPER.

Application filed February 8, 1928. Serial No. 252,812.

This invention relates to automobile bumpers.

The bumper to which the invention applies in particular has a rigid impact bar and spring supporting bars.

An object of the invention is to provide an ornamental bumper having a large capacity to absorb shocks.

Another object is to provide a bumper which may be readily and economically manufactured.

According to the invention, the impact bar is embraced by clips intermediate the ends and the center thereof which form pivotal connections with spring supporting bars or arms.

The impact bar is preferably tubular and may be pivotally connected at the ends thereof to the outer ends of the supporting bars or may be provided with clips adjacent each end which are pivotally connected to the supporting bars.

The supporting bars are arranged parallel to the plane of the impact bar and have the inner ends thereof formed into open loops and pivotally connected to clips arranged upon the impact bar intermediate the ends and the center thereof.

Bumpers embodying the invention are illustrated in the accompanying drawings in which the views are as follows.

Figure 3:
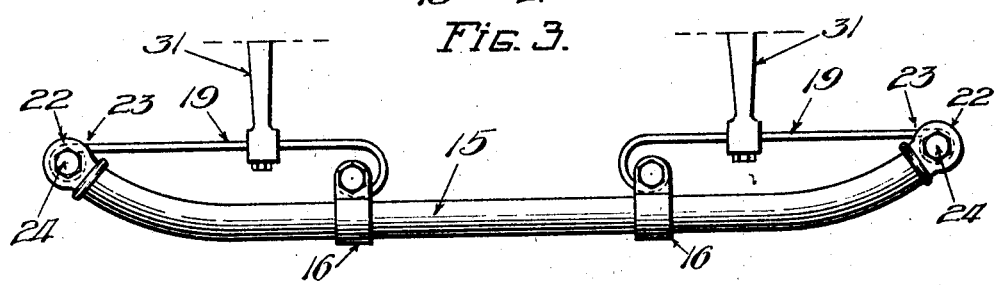
Figure 4:
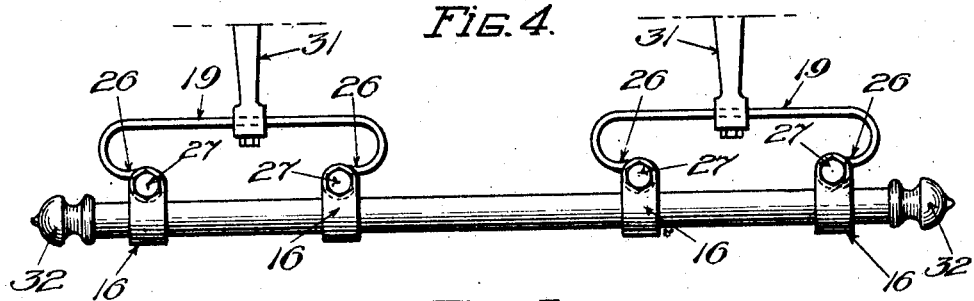
Figure 5:
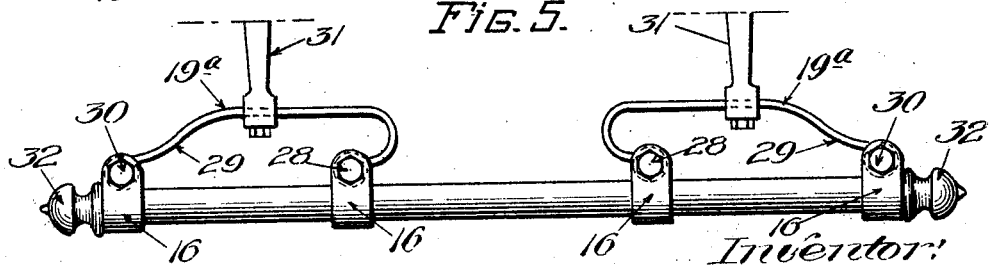

Figs. 3, 4 and 5 are top plan views of other forms of bumpers.

Figure 1:
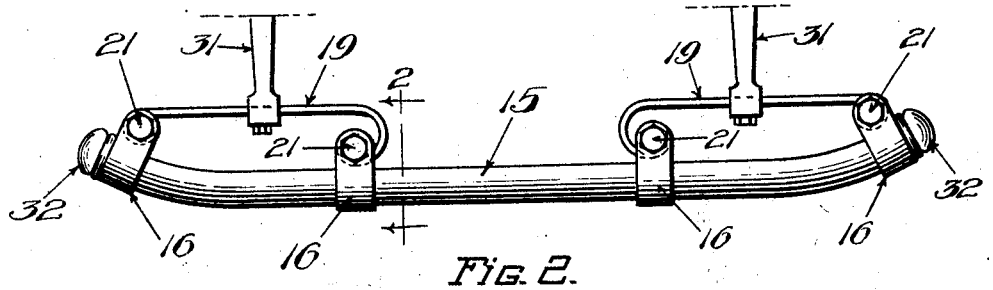
Fig. 1 is a top plan view of one form of bumper.
Figure 2:
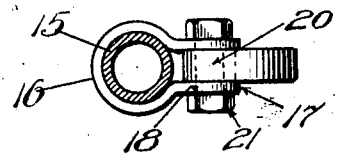
Fig. 2 is a transverse section on the line 2—2 of Fig. 1.

The bumper has a tubular impact bar 15 which may be curved rearwardly at the ends thereof, as shown in Figs. 1 and 3, or straight, as shown in Figs. 4 and 5.

Clips 16 embrace the impact bar intermediate the ends and the center thereof and are provided with ears 17 having bolt holes 18.

The impact bar is supported by arms or bars 19 made of flat spring steel and having the inner end of each bent to form an open loop and provided with an eye 20 which is arranged between the ears 17 and pivotally connected thereto by bolts or pins 21.

The outer ends of the supporting bars 19 are also provided with an eye 20 and may be connected to a clip 16, as shown in Figs. 1, 4 and 5, or to a fitting 22 arranged in the end of the impact bar, as shown in Fig. 3.

The fitting 22 has a pocket 23 to receive the outer end of the supporting bar 19 which is pivotally connected therein by a pin or bolt 24.

The bumper shown in Fig. 4 has both ends of the supporting bars 19 formed into open loops, turned forwardly at 26 to space the impact bar farther from the automobile to which it is attached, and pivoted to the clips 16 by bolts 27.

The bumper shown in Fig. 5 has the inner ends of the supporting bars 19ª formed similarly to the ends of the supporting bars 19 of Fig. 4 and pivotally connected to the clips 16 by pins or bolts 28.

The outer ends of the bars 19ª are bent forwardly at 29 and connected by pins or bolts 30 to clips 16 arranged at the ends of the impact bar.

The arrangement shown in Figs. 4 and 5 spaces the impact bar farther from the brackets 31, by means of which the bumper is attached to an automobile, and permits greater deflection of the supporting bars than is possible in the forms shown in Figs. 1 and 3.
The ends of the impact bar may be closed by caps 32 of any desired configuration.

The impact bar is supported at four separate points and the innermost of such points are spaced from the center of the impact bar so that a shock received by the impact bar will be transmitted to both supporting bars and largely absorbed by the same to prevent damage to the automobile or deformation of the impact bar.
The invention herein set forth is susceptible of various other modifications without departing from the scope thereof as hereafter claimed.

The invention is hereby claimed as follows:

1. An automobile bumper comprising a rigid impact bar, a pair of clips arranged on each end of said bar, and separate spring supporting bars pivoted to each pair of clips and having the inner ends thereof looped.

2. An automobile bumper comprising a rigid impact bar, clips arranged upon said bar adjacent the ends thereof and intermediate said ends and the central part thereof, separate spring supporting bars pivotally connected to said clips and having looped ends, and means carried by said supporting bars to attach said bumper to an automobile.

3. An automobile bumper comprising a rigid impact bar, clips embracing said bar and having apertured ears, looped spring bars having the ends thereof arranged between said ears, and pins pivotally connecting said supporting bars to said clips.

In witness whereof, I have hereunto subscribed my name.

WILLIAM A. STARCK.